United States Patent Office 3,321,429
Patented May 23, 1967

3,321,429
REACTION PRODUCT OF HYDROXY-CONTAINING POLYMER AND POLYCARBOXYLIC ACID ANHYDRIDE, AND WATER SOLUBLE SALTS THEREOF
Joachim Thörmer, Dusseldorf, Hans Zoebelein, Monheim, Rhineland, and Manfred Dohr, Dusseldorf-Holthausen, Germany, assignors to Henkel & Cie. G.m.b.H., Dusseldorf-Holthausen, Germany, a corporation of Germany
No Drawing. Filed Nov. 10, 1964, Ser. No. 410,261
Claims priority, application Germany, Nov. 29, 1963, H 50,986, H 50,987
16 Claims. (Cl. 260—29.4)

The invention relates to novel water-dilutable coating compositions for forming baked enamels which contain novel water-soluble binders prepared by reaction of water-insoluble polymers having primary hydroxyl groups and a hydroxyl number of at least 100 with dicarboxylic acid anhydrides or mono anhydrides of tricarboxylic acids to form the corresponding partial esters which are partially or completely converted to ammonium or amine salts. The invention also relates to a novel process for the preparation of the said water soluble binders.

It is an object of the invention to provide novel water-dilutable coating compositions containing water-soluble binders for forming baked enamel coatings which are solvent stable, firmly adhering and hard.

It is another object of the invention to provide a novel process for the preparation of water-dilutable binders for coating compositions.

These and other objects and advantages of the invention will become obvious from the following detailed description.

The novel water soluble binders of the invention for water-dilutable coating compositions are formed by reacting a water-insoluble polymer having primary hydroxyl groups and a hydroxyl number of at least 100 with an anhydride selected from the group consisting of 0.2 to 0.75 mole, preferably 0.4 to 0.6 mole per hydroxyl equivalent of a dicarboxylic acid anhydride and 0.1 to 0.375 mole, preferably 0.2 to 0.3 mole, per hydroxyl equivalent of a mono anhydride of a tricarboxylic acid to form the corresponding partial ester and at least partially converting the latter into a salt selected from the group consisting of ammonium salt and an amine salt.

The water-insoluble polymers containing primary hydroxy groups and having a hydroxyl number of at least 100 are known or can be made by known processes. Examples of said water-insoluble polymers are copolymers or terpolymers of allyl alcohol, preferably with monomers whose homo polymers are water-insoluble. Suitable co-monomers for allyl alcohol are esters of α,β-unsaturated carboxylic acids such as acrylic acid, methacrylic acid, maleic acid, fumaric acid, aconitic acid or itaconic acid with lower alkanols having 1 to 4 carbon atoms; vinyl esters cush as vinyl acetate, vinyl butyrate, etc.; vinyl ethers such as butyl vinyl ether; unsaturated nitriles such as acrylonitrile; amides of unsaturated acids such as N-substituted acrylamide or methacrylamide; and unsaturated hydrocarbons such as styrene and vinyl toluene. Particularly preferred are copolymers of allyl alcohol and acrylic acid esters of alkanols having 1 to 4 carbon atoms.

Other polymerizable monomers with primary hydroxyl groups can be used in place of or in addition to allyl alcohol to form the starting copolymers or terpolymers. Examples of suitable monomers are unsaturated alcohols such as methallyl alcohol, 1-butene-4-ol, etc.; ω-hydroxyalkyl esters of α,β-unsaturated carboxylic acids such as the mono esters of acrylic and methacrylic acids with diols such as ethylene glycol, propylene glycol-1,2, propylene glycol-1,3, isomeric butanediols, pentanediols and hexane diols, diglycol, triglycol, etc.; mono esters of unsaturated carboxylic acids with polyols such as glycerine, trimethylolpropane, pentaerythrite, etc.

The said water-insoluble polymers with primary hydroxyl groups can be prepared by known polymerization methods with the aid of known radicals such as peroxides. Suitable water-insoluble polymers can also be prepared by reduction or hydration of polymers containing carboxyl or carboxylic acid ester groups to polymers with primary hydroxyl groups or by the known addition of water to 1,2-butadiene polymers.

A preferred group of water-insoluble polymers are polyethers containing primary hydroxyl groups which can be prepared by ring-opening polymerization of derivatives of trimethylene oxide containing hydroxyl groups in the presence of ionic catalysts. These derivatives of trimethylene oxide are easily prepared from compounds such as trimethylol ethane, trimethylol propane, trimethylol butane, etc., or pentaerythrite.

The starting materials for the preparation of the said polyethers have the formula

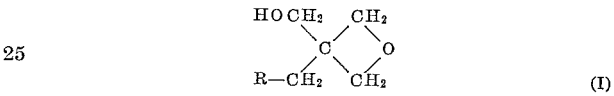
(I)

wherein R is selected from the group consisting of hydrogen, hydroxyl, halogen, cyano and organic radicals such as lower alkyl, lower alkoxy and lower acyloxy. Examples of suitable monomers of this type are 3-hydroxymethyl-3-methyl-trimethyleneoxide, 3 - hydroxymethyl-3-ethyl-trimethyleneoxide, 3 - hydroxymethyl - 3 - propyl-trimethyleneoxide, 3 - hydroxymethyl - 3 - chloromethyl-trimethyleneoxide, 3 - hydroxymethyl-3-ethoxymethyl-trimethyleneoxide, 3 - hydroxymethyl-3-acetoxymethyl-trimethyleneoxide, 3,3' - bishydroxymethyl-trimethyleneoxide, etc. Particularly preferred are 3-hydroxymethyl-3-methyl-trimethylene oxide and 3-hydroxymethyl-3-ethyl-trimethylene oxide.

Mixtures of the said monomers can also be used particularly when the homo polymers of a specific monomer are not sufficiently soluble for further reaction. Copolymers of the said trimethyleneoxide compounds with other monomers may also be prepared. Suitable co-monomers are trimethyleneoxide derivatives without primary hydroxyl groups such as 3-ethyl-3-chloromethyl-trimethyleneoxide, 3,3-bis-(chloromethyl)-trimethyleneoxide, etc.; esters of the trimethyleneoxide derivatives with primary hydroxyl groups such as the methacrylic acid ester of 3-hydroxymethyl-3-ethyl-trimethyleneoxide; alkylene oxides such as propylene-oxide; epichlorohydrin; tetrahydrofuran; trioxymethylene and derivatives thereof.

The said water-soluble polyethers containing primary hydroxyl groups may be prepared in the usual way with catalysts for ionic polymerization. Suitable catalysts are Friedel-Crafts catalysts such as boron fluoride and its complexes such as borofluoride diethyletherate, aluminum chloride, zinc chloride, stannous tetrachloride, gallium chloride, antimonic pentachloride, tertiary oxonium salts such as triethyl-oxonium fluoborate; strong acid catalysts such as perchloric acid, phosphoric acid, sulfuric acid, p-toluene sulfonic acid or ion-exchange resins containing sulfonic acid such as polystyrene. The polymerization may be effected in the absence or presence of inert organic solvents such as methylene chloride, 1,2-dichloroethane, benzene, methanol and dioxane over a wide temperature range of −80 to 150° C.

The water-insoluble polymers having primary hydroxyl groups should have a hydroxyl number of at least 100. For polymers with low K values (in cyclohexanone— Fickentscher, Cellulosechemie, vol. 13, 1932, p. 58) of about 6 to 15, a hydroxyl number below 200, usually 120 to 160, is usually sufficient but for polymers with higher K values, up to 35 or more, the hydroxyl number is preferably not less than about 200 to 300. The K-value of the said polymers should not be higher than 50 and is preferably less than 30.

Depending upon the desired characteristics of the coating compositions, the polymers may be modified by the addition of small amounts of plasticizers, preferably with compounds containing an alkyl radical with 4 to 18 carbon atoms. Examples of suitable compounds are esters such as octyl methacrylate, dodecyl acrylate, vinyl palmitate, dibutyl maleate and ethers such as octadecyl vinyl ether. For the water-insoluble polyethers, suitable plasticizers are derivatives of oxides such as ethyleneoxide, propyleneoxide or trimethyleneoxide containing an alkyl radical of 4 to 18 carbon atoms; and vinyl compounds, particularly vinyl ethers such as isobutyl vinyl ether and vinyl ethers of fatty alcohols having a high degree of unsaturation such as that obtained by reduction of linoleic acid.

Examples of suitable anhydrides for reaction with the water-insoluble polymers containing primary hydroxyl groups are anhydrides of aliphatic and cycloaliphatic dicarboxylic acids such as succinic acid anhydride, glutonic acid anhydride, polymeric anhydride of adipic acid, hexahydrophthalic acid anhydride, anhydrides of dimerized fatty acids, etc.; anhydrides of unsaturated dicarboxylic acids and aromatic dicarboxylic acids such as maleic acid anhydride, dichloromaleic acid anhydride, itaconic acid anhydride, dodecenyl succinic acid anhydride, phthalic acid anhydride, tetrahydrophthalic acid anhydride, methyltetrahydrophthalic acid anhydride, endomethylene-tetrahydrophthalic acid anhydride, methyl endomethylenetetrahydrophthalic acid anhydride, tetrachlorophthalic acid anhydride, addition product of maleic acid anhydride and hexachlorocyclopentadiene, 9,10-anthracenedicarboxylic acid anhydride, endo-oxatetrahydrophthalic acid anhydride, naphthalic acid anhydride, etc.; and mono anhydrides of tricarboxylic acids such as the monoanhydrides of hemimellitic acid and trimellitic acid. Mixtures of anhydrides of dicarboxylic acids and mono anhydrides of tricarboxylic acids may also be used. The preferred anhydride is maleic acid anhydride, alone or in admixture with phthalic acid anhydride.

The said carboxylic acid anhydrides are to be used in less than stoichiometric amounts so the polymers still contain a considerable number of primary hydroxyl groups after reaction with the anhydrides and preferably contain more hydroxyl groups than carboxyl groups. The dicarboxylic acid anhydrides are used in the amount of 0.2 to 0.75 mole, preferably 0.4 to 0.6 mole, per hydroxyl equivalent and the tricarboxylic acid anhydrides are used in the amount of 0.1 to 0.375 mole, preferably 0.2 to 0.3 mole, per hydroxyl equivalent. The carboxylic acid anhydride is used in sufficient amounts to effect water-solubility of the said amine or ammonium salts.

The said reaction which forms the corresponding semi-esters is preferably effected in an inert organic solvent such as methylene chloride, ethylene chloride, trichloro ethylene, nitrobenzene, dimethylformamide, methyl ethyl ketone, dioxane, dimethyl sulfoxide, etc. The reaction may be accelerated with catalysts such as tertiary amines like triethylene amine, tributylamine, dimethylaniline or pyridine. The reaction temperature should not exceed 85° C. to avoid undesired premature esterification of free carboxyl groups which may affect the water solubility of the binders or may increase the viscosity to an undesired degree.

Usually the polymeric semi-esters need not be purified and after the solvent is removed, the product may be converted into the desired salt by reaction with an aqueous solution of ammonia or an easily volatile amine such as methylamine, ethylamine, dimethylamine, trimethylamine, triethylamine, etc. Difficultly volatile amines may also be used by introducing the amines into the lacquer film during the baking process since these amines will not evaporate. Examples of such amines are ethanol amine, diethanol amine, triethanol amine, corresponding propanol and butanol amines or their corresponding quaternary ammonium bases. Frequently, the difficultly volatile amines are used in admixture with ammonia or an easily volatile amine. The said ammonia or amines need not be used in stoichiometric amounts and in many cases less than stoichiometric amounts are satisfactory to form salts which are just about water-soluble.

Other known additives can be added to the binders of the invention to form the final coating compositions. Examples of additives are pigments; flowing agents such as ethyl glycol, semi-esters of glycol such as monoacetate of glycol, isomeric butanols, cyclohexanol; and hardening catalysts such as p-toluene sulfonic acid or naphthenates. Also, water-soluble precondensates of aminoplasts may be added in amounts up to 25% of the amount of the binder. Examples of suitable aminoplast precondensates are melamine-formaldehyde condensates, preferably modified with ethanol or methanol. However, excellent lacquers for baked enamels can be obtained without the latter additives.

To form the baked enamels, the metal to be coated is dipped into or sprayed with an aqueous solution of the said binder, then dried and subsequently baked at temperatures of about 130 to 180° C. in the usual manner. The enamel coatings are hard, firmly adhering, of satisfactory flexibility and stable against water and organic solvents.

In the following examples there are described several preferred embodiments to illustrate the invention. However, it should be understood that the invention is not intended to be limited to the specific embodiments.

*Example I*

A terpolymer was prepared according to the Example 7 of the United States Patent No. 2,945,835 from vinyl acetate, allyl alcohol and the methyl ester of acrylic acid having an OH number of 200 and a K value of 14 (in cyclohexanone). 163 gm. of this polymer were dissolved in 240 ml. of ethylene chloride and after the addition of 24 gm. of maleic acid anhydride, the mixture was stirred for a period of 12 hours at a temperature of 80° C. Then the solvent was removed by distillation under vacuum and the residue obtained was dissolved in an aqueous ammonia solution having sufficient ammonia so that the mixture had a pH value of 6–7. The solution was diluted to "dipping" viscosity (Ford viscosimeter No. 4, 40–45 seconds).

Sheet iron was coated by dipping with the said solution, exposed to air for a short period and then was baked for 30 minutes at a temperature of 170° C. Glossy, flexible lacquer films resistant to water and organic solvents were obtained. The coatings showed a very good adhesion and an Erichsen depth of more than 7 mm. The characteristic data obtained with the grid-cut were of 1a and the hardness of the lacquer was 78 determined by the Buchholz method.

*Example II*

104 gm. of a commercial copolymer of styrene and allyl alcohol (Shell Polyol 450) having an OH number of 250 and a K value of 11, were dissolved in 200 ml. of ethylene chloride. After addition of 22 gm. of maleic acid anhydride, the mixture was heated for a period of 8 hours at reflux and then the solvent was removed by distillation under vacuum. The residue was dissolved in aqueous ammonia, adding just enough ammonia so that the pH value was about 7 and then the mixture obtained was diluted to "dipping" viscosity (Ford viscosimeter No. 4, 40–45 seconds).

The hard and glossy film prepared from this product in the manner described in Example I was distinguished by an especially good impact strength as well as by a satisfactory resistance to water and organic solvents.

Example III 224 gm. of the same commercial copolymer of styrene and allyl alcohol used in Example II were diluted in 400 ml. of ethylene chloride. After the addition of 60 gm. of succinic acid anhydride and 3 gm. of triethylamine, the mixture was heated to reflux for 8 hours and then the solvent was removed by distillation under vacuum. The residue was dissolved in acetone and precipitated with water. Then, the product was dissolved in aqueous ammonia to obtain a solution having a pH value of about 7. The solution was diluted to "dipping" viscosity (Ford viscosimeter No. 4, 40–45 seconds).

From this product, a lacquer film was produced in the same manner as in Example I which showed no effect after being exposed to water for a period of 24 hours.

Example IV 200 gm. of a terpolymer prepared according to Example 7 of the United States Patent No. 2,945,835 from allyl alcohol, vinyl acetate and the ethyl ester of acrylic acid having an OH number of 221 were dissolved in 200 gm. of ethylene chloride. After adding 58 gm. of phthalic acid anhydride to the mixture, the mixture was heated under reflux with stirring for a period of 8 hours. The solvent was removed by distillation under vacuum and the residue was dissolved in aqueous ammonia to obtain a solution having a pH value of about 7 and then the product was diluted to a "dipping" viscosity.

The lacquer films produced from this product showed a very good adhesion and the Erichsen depth was above 7 mm.

Example V 48 gm. of the methacrylic acid ester of 2,2-dimethyl-4-hydroxy-methyldioxolane-1,3 - (isopropylidene glycerine) were copolymerized with 64.3 gm. of the ethyl ester of acrylic acid in 1000 gm. of toluene in the presence of 12 gm. of azoisobutyric acid dinitrile as catalyst. The polymerization was conducted at a temperature of 95° C. over a period of 4 hours. The polymerizate was precipitated by addition of benzene and was taken up in acetone. The acetone solution was then mixed with water until it became cloudy and then the pH value of the solution was adjusted to 2–3. Then, the solution was heated for 2 hours at 50° C. and the product obtained was precipitated with water. The aqueous phase was extracted with ethylene chloride and the extract and the precipitate were combined, washed until the wash water was neutral and carefully dried.

The copolymerizate obtained had an OH number of 230 and 33 gm. of this product were dissolved in 68 ml. of ethylene chloride. After adding 4.3 gm. of maleic acid anhydride to the mixture, the solution was heated for a period of 8 hours at 80° C. and the solvent was removed by distillation under vacuum. The residue was dissolved in aqueous ammonia and the pH value was adjusted to about 6–7. The solution was diluted to a "dipping" viscosity. Well adhering, flexible lacquer films were obtained with this solution.

Example VI 1,200 gm. of allyl alcohol were mixed with 500 gm. of the ethyl ester of acrylic acid and 40 gm. of di-tert.-butyl peroxide and the mixture was heated in an autoclave for 30 minutes to 180–185° C. The unreacted monomers were separated by vacuum distillation and the remaining polymer (741 gm.) had an OH number of 230. 100 gm. of the polymer were dissolved in 120 ml. of anhydrous dioxane and after the addition of 18.1 gm. of maleic acid anhydride and 5 ml. of triethylamine, the mixture was heated with stirring to 80–90° C. for a period of 8 hours. Then, 113 ml. of dioxane were removed by distillation under vacuum, and the residue was dissolved in 150 ml. of water and 15 ml. of concentrated amomnia. The solution was clear and light in color with a solids content of 42.7% and a pH value of 7.2. The solution was then diluted to "dipping" viscosity.

By dipping means, iron sheets were coated with the solution, exposed shortly to air at a temperature of 60° C. and then baked at a temperature of 170° C. (30 minutes). The coating had a hardness (according to Buchholz) >125, excellent adhesion, very good flexibility (>9 mm.) and a grid-cut value of 1a.

Water-resistance—no effect after 96 hours;
Ethyleneglycol, monoethyl ether—no effect after 24 hours;
Acetone—no visible effect.

Example VII 1,200 gm. of allyl alcohol were admixed with 500 gm. of the ethyl ester acrylic acid, 50 gm. of freshly distilled styrene and 40 gm. of di-tert.-butyl peroxide and the mixture was heated to 180° C. in an autoclave for a period of 30 minutes. Then, the unreacted monomers were removed by distillation under vacuum. The polymer (788 gm.), which had an OH number of 215, was dissolved in 930 ml. of anhydrous dioxane and heated with 116 gm. of maleic acid anhydride and 15 ml. of triethylamine to 80–85° C. for a period of 8 hours. Then 870 ml. of dioxane were removed by distillation under vacuum and the residue was dissolved in 1,200 ml. of water and 140 ml. of concentrated ammonia. The solution had a solids content of 36.9% and a pH value of 7.0. The solution was diluted to "dipping" viscosity.

Tin-plates were coated with this solution and the film showed excellent water-resistance, sufficient solvent-stability, very good adhesion and flexibility (Erichsen depth >9 mm.) and a hardness >125 (Buchholz).

Example VIII 1,200 gm. of allyl alcohol and 500 gm. of the butyl ester of acrylic acid were admixed with 17 gm. of di-tert.-butyl peroxide and the mixture was heated to 180° C. in an autoclave for a period of 30 minutes. By vacuum distillation, the unreacted monomers were separated and the residual polymer had an OH number of 230 and a molecular weight of 900. 100 gm. of the polymer were dissolved in 100 gm. of anhydrous dioxane and after the addition of 16.1 gm. of maleic acid anhydride and 3 gm. of triethylamine, the mixture was stirred at a temperature of 80–85° C. for a period of 8 hours. Then, the solvent was removed by distillation under vacuum at a bath temperature to 50° C. and the residue was dissolved in 100 ml. of water and 17 gm. of triethylamine. The clear solution had a pH value of 7.5 and was diluted to "dipping" viscosity.

By dipping, phosphatized iron sheets were coated with the solution, were exposed to air at 60° C. for a short time and then were baked for a period of 30 minutes at a temperature of 170° C. The coatings obtained were resistant to water and organic solvents and showed good mechanical values, e.g. an Erichsen depth >7 mm.

Example IX

A polyether containing primary hydroxyl groups was prepared according to Example 2 of the DBP No. 1,023,227 by ring-opening polymerization of 3-hydroxymethyl-3-ethyltrimethylene-oxide in a benzene solution with the aid of borofluoride diethyl etherate. 100 gm. of the water insoluble resin obtained which had an OH number of 498 and a K-value of 11 (in cyclohexanone), were dissolved in 150 gm. of anhydrous ethylene chloride and after the addition of 35 gm. of maleic acid anhydride and 2 ml. of triethylamine, the solution was heated at reflux with stirring for a period of 8 hours. The solvent was removed by vacuum distillation and the residue was dissolved in aqueous ammonia to obtain a solution having a pH value of 6–7. Then the solution was diluted to "dipping" viscosity (Ford viscosimeter No. 4, 40–45 seconds).

Iron sheets were coated with the solution by dipping, exposure to air for a short period and baking at a temperature of 165° C. for 30 minutes. Glossy, flexible films were obtained which were water-resistant. The coatings showed a good adhesion and had a good Erichsen depth >8 mm. and a hardness of 102 according to Buchholz. The characteristic data found with the grid-cut were of 1a.

*Example X*

A polyether containing primary hydroxyl groups was prepared analogous to Example 2 of the DBP No. 1,023,-227 by ring-opening polymerization of 95 gm. of 3-hydroxymethyl-3-ethyltrimethylene oxide and 5 gm. of the vinyl ether of the unsaturated alcohol derived from the fatty acids of linseed oil by means of borotrifluoride-diethyletherate. The polymer obtained was dissolved in 150 gm. of ethylene chloride and heated to reflux with 29.5 gm. of maleic acid anhydride and 2 gm. of triethylamine for a period of 8 hours with constant stirring. The solvent was removed by vacuum distillation and the residue was dissolved in aqueous ammonia to obtain a solution having a pH value of 6–7. The solution was diluted to "dipping" viscosity (Ford viscosimeter No. 4, 40–45 seconds).

Tin-plates were coated with the solution by dipping, exposure to air for a short time and baking for 30 minutes at 165° C. Glossy, flexible films were obtained, which were water-resistant. The coatings showed good adhesion and had an Erichsen depth >8 mm. The characteristic data found with the grid-cut were of 1a.

*Example XI*

95 gm. of 3-hydroxymethyl-3-ethyltrimethylene oxide and 5 gm. of the vinyl ether of the unsaturated alcohol derived from the fatty acids of linseed oil were dissolved in 150 gm. of anhydrous ethylene chloride. Then, 1 part by volume of a molar solution of borofluoride diethyletherate in benzene was added and after termination of the exothermic reaction, the mixture was heated to 60° C. for 15 hours. Then, 3 ml. of triethylamine and 35 gm. of maleic acid anhydride were added and the mixture was heated at reflux with stirring for 8 hours. The solvent was removed by vacuum distillation and the residue was dissolved in aqueous ammonia to obtain a solution having a pH value of 6–7. The solution was diluted to "dipping" viscosity (Ford viscosimeter No. 4, 40–45 seconds).

In the same manner as described in Examples IX and X, the aqueous solution was applied to iron sheets and the lacquer was baked. The coatings were water-resistant, showed a very good adhesion and had an Erichsen depth >8 mm. The characteristic data found with the grid-cut were of 1a.

Various modifications of the compositions of the invention may be made without departing from the spirit or scope thereof and it is to be understood that the invention is to be limited only as defined in the appended claims.

We claim:

1. Water-soluble binders for water-dilutable coating compositions for baked enamels formed by reacting a water-insoluble polymer having primary hydroxyl groups and a hydroxyl number of at least 100 with an anhydride selected from the group consisting of 0.2 to 0.75 mole per hydroxyl equivalent of a dicarboxylic acid anhydride and 0.1 to 0.375 mol per hydroxyl equivalent of a mono anhydride of a tricarboxylic acid to form the corresponding partial acid esters and at least partially converting the latter into a salt selected from the group consisting of the ammonium salt and an amine salt, said dicarboxylic and tricarboxylic acids being selected from the group consisting of hydrocarbon carboxylic acids, chlorine substituted hydrocarbon carboxylic acids and oxo substituted hydrocarbon carboxylic acids.

2. The binders of claim 1 wherein the K value of the water-insoluble polymer is less than 50.

3. The binders of claim 1 wherein the K value of the water-insoluble polymer is less than 30.

4. The binders of claim 1 wherein 0.4 to 0.6 mole per hydroxyl equivalent of a dicarboxylic acid anhydride is used.

5. The binders of claim 1 wherein 0.2 to 0.3 mole per hydroxyl equivalent of a mono anhydride of a tricarboxylic acid is used.

6. The binders of claim 1 wherein the water-insoluble polymer is a copolymer of allyl alcohol and an alkyl ester of acrylic acid wherein the alkyl radical has 1 to 4 carbon atoms.

7. The binders of claim 1 wherein the anhydride is maleic acid anhydride.

8. The binders of claim 1 wherein the salt is the ammonium salt.

9. The binders of claim 1 wherein the salt is the salt of an easily volatile amine.

10. The binders of claim 1 wherein the salt is the salt of a difficultly volatile amine.

11. Water-soluble binders for water-dilutable coating compositions for baked enamels formed by reacting water-insoluble polyethers having a hydroxyl number of at least 100 formed by ring-opening homo or co-polymerization of trimethylene oxide derivatives of the formula

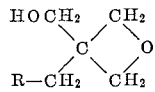

wherein R is selected from the group consisting of hydrogen, hydroxyl, halogen, cyano, lower alkyl, lower alkoxy and lower acyloxy with an anhydride selected from the group consisting of 0.2 to 0.75 mole per hydroxyl equivalent of a dicarboxylic acid anhydride and 0.1 to 0.375 mole per hydroxyl equivalent of a mono anhydride of a tricarboxylic acid to form the corresponding partial acid esters and at least partially converting the latter into a salt selected from the group consisting of the ammonium salt and an amine salt, said dicarboxylic and tricarboxylic acids being selected from the group consisting of hydrocarbon carboxylic acids, chlorine substituted hydrocarbon carboxylic acids and oxo substituted hydrocarbon carboxylic acids.

12. The binders of claim 11 wherein the trimethylene oxide derivative is 3-hydroxymethyl-3-methyl-trimethylene oxide.

13. The binders of claim 11 wherein the trimethylene oxide derivative is 3-hydroxymethyl-3-ethyl-trimethylene oxide.

14. A coating composition for baked enamels comprising an aqueous solution of a water-soluble binder formed by reacting a water-insoluble polymer having primary hydroxyl groups and a hydroxyl number of at least 100 with an anhydride selected from the group consisting of 0.2 to 0.75 mole per hydroxyl equivalent of a dicarboxylic acid anhydride and 0.1 to 0.375 mole per hydroxyl equivalent of a mono anhydride of a tricarboxylic acid to form the corresponding partial acid esters and at least partially converting the latter into a salt selected from the group consisting of the ammonium salt and an amine salt and a water-soluble aminoplast precondensate, said dicarboxylic and tricarboxylic acids being selected from the group consisting of hydrocarbon carboxylic acids, chlorine substituted hydrocarbon carboxylic acids and oxo substituted hydrocarbon carboxylic acids.

15. A coating composition for baked enamels comprised of an aqueous solution of a water-soluble binder formed by reacting a water-insoluble terpolymer of allyl alcohol, vinyl acetate and a lower alkyl ester of acrylic acid having a hydroxyl number of at least 100 with 0.2 to 0.75 mole per hydroxyl equivalent of maleic acid anhydride to form the corresponding partial acid ester and partially converting the latter into its ammonium salt.

16. A coating composition for baked enamel comprised of a water-soluble binder formed by reacting a water-insoluble allyl alcohol-styrene copolymer having a hydroxyl number of at least 100 with 0.2 to 0.75 mole per hydroxyl equivalent of an aliphatic dicarboxylic acid anhydride to form the corresponding partial acid ester and partially converting the latter into its ammonium salt.

References Cited by the Examiner

UNITED STATES PATENTS 2,861,057  11/1958  Merrill et al. _____ 260—78.4

FOREIGN PATENTS 931,130  7/1955  Germany.
941,425  11/1963  Great Britain.
1,023,227  1/1958  Germany.
1,036,426  8/1958  Germany.

MURRAY TILLMAN, *Primary Examiner.*

W. J. BRIGGS, SR., *Assistant Examiner.*